United States Patent [19]

Friederichs et al.

[11] Patent Number: 5,115,438
[45] Date of Patent: May 19, 1992

[54] METHOD FOR REDUNDANCY-SAVING, ERROR-CORRECTING CODING IN DIGITAL RADIO LINK SYSTEMS HAVING MULTI-LEVEL MODULATION

[75] Inventors: Karl-Josef Friederichs, Puchheim; Otmar Ringelhaan, Munich, both of Fed. Rep. of Germany

[73] Assignee: Siemens Aktiengesellschaft, Munich, Fed. Rep. of Germany

[21] Appl. No.: 383,652

[22] Filed: Jul. 24, 1989

[30] Foreign Application Priority Data

Aug. 4, 1988 [DE] Fed. Rep. of Germany ....... 3826564

[51] Int. Cl.$^5$ .............................................. G06F 11/00
[52] U.S. Cl. .......................................... 371/43; 371/45
[58] Field of Search ........................ 371/43, 44, 45, 36

[56] References Cited

U.S. PATENT DOCUMENTS

| | | | |
|---|---|---|---|
| 4,369,512 | 1/1983 | Brossard et al. | 371/43 |
| 4,404,674 | 9/1983 | Rhodes | 371/43 |
| 4,476,458 | 10/1984 | Dollard | 371/43 X |
| 4,493,082 | 1/1985 | Cumberton et al. | 371/43 |
| 4,622,670 | 11/1986 | Martin | 371/43 |
| 4,677,626 | 6/1987 | Betts et al. | 371/43 |
| 4,700,363 | 10/1987 | Tomlinson et al. | 371/43 X |

OTHER PUBLICATIONS

M. Kavehrad: "Convolutional Coding For High-Speed Microwave Radio Communications", AT&T Technical Journal, vol. 64, No. 7, Sep. 1985, pp. 1625-1637.
S. Bellini et al.: "Coding For Error Correction in High Capacity Digital Radio: An Application On Radio-Ralay Systems (ECRR)", Nov. 1986, pp. 166-172.
T. Noguchi et al., "6 GHz 135 MBPS Digital Radio System With 64 QAM Modulation", International Conference On Communications (ICC), Jun. 19-22, 1983, vol. 3, pp. 1472-1477.
G. Ungerboeck, "Trellis-Coded Modulation With Redundant Signal Sets", Parts I and II, IEEE Communications Magazine, vol. 25, No. 2, Feb. 1987, pp. 5-21.
P. Mecklenburg et al., "Correction of Errors in Multilevel Gray-Coded Data"; IEEE Transactions Information Theory, vol. IT-19, No. 3, May 1973, pp. 336-340.
Clark et al., *Error-Correction Coding for Digital Communications*, 1981, pp. 9, 285-292.

*Primary Examiner*—Jerry Smith
*Assistant Examiner*—Allen M. Lo
*Attorney, Agent, or Firm*—Hill, Van Santen, Steadman & Simpson

[57] ABSTRACT

For the employment of an FEC method in systems of a variety of types, the serial binary data stream to be transmitted is supplied to a means for rate matching and for serial-to-parallel conversion wherein, first, the data rate is increased to the transmission rate upon formation of free locations for the acceptance of redundancy bits and, second, a corresponding plurality of parallel data streams are generated from the serial data stream, respectively one half of said parallel data streams forming the I-channel and the other half forming the Q-channel. The redundancy locations lie in the least significant bits of the I-channel and Q-channel. The more significant bits of the I-channel and the Q-channel directly control the appertaining inputs of a quadrature modulator, whereas the least significant bit is supplied to the appertaining input via a respective multiplexer. In addition, the least significant bit of the I-channel and the Q-channel is respectively supplied to a coder, each of these coders considering a defined plurality of incoming bits; and generating one or more redundancy bits therefrom in accord with the coding rule of a specific underlaid code. These redundancy bits are inserted with the assistance of the multiplexers at locations in the I-channel and Q-channel, that are provided for this purpose.

10 Claims, 4 Drawing Sheets

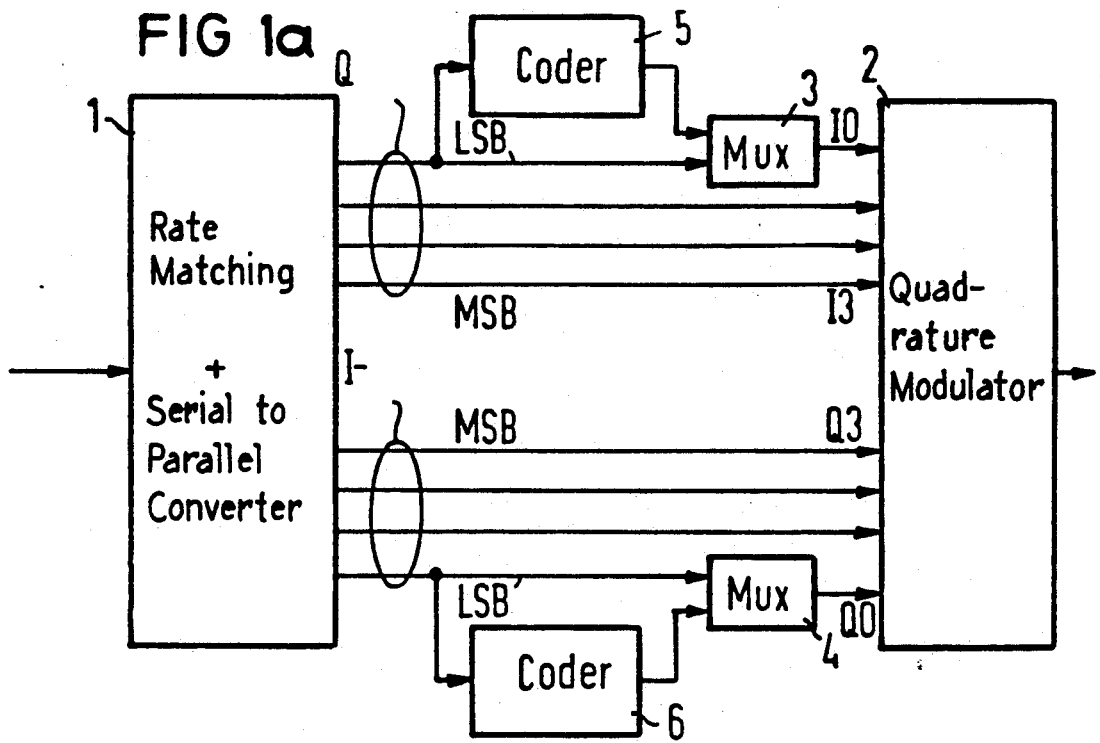
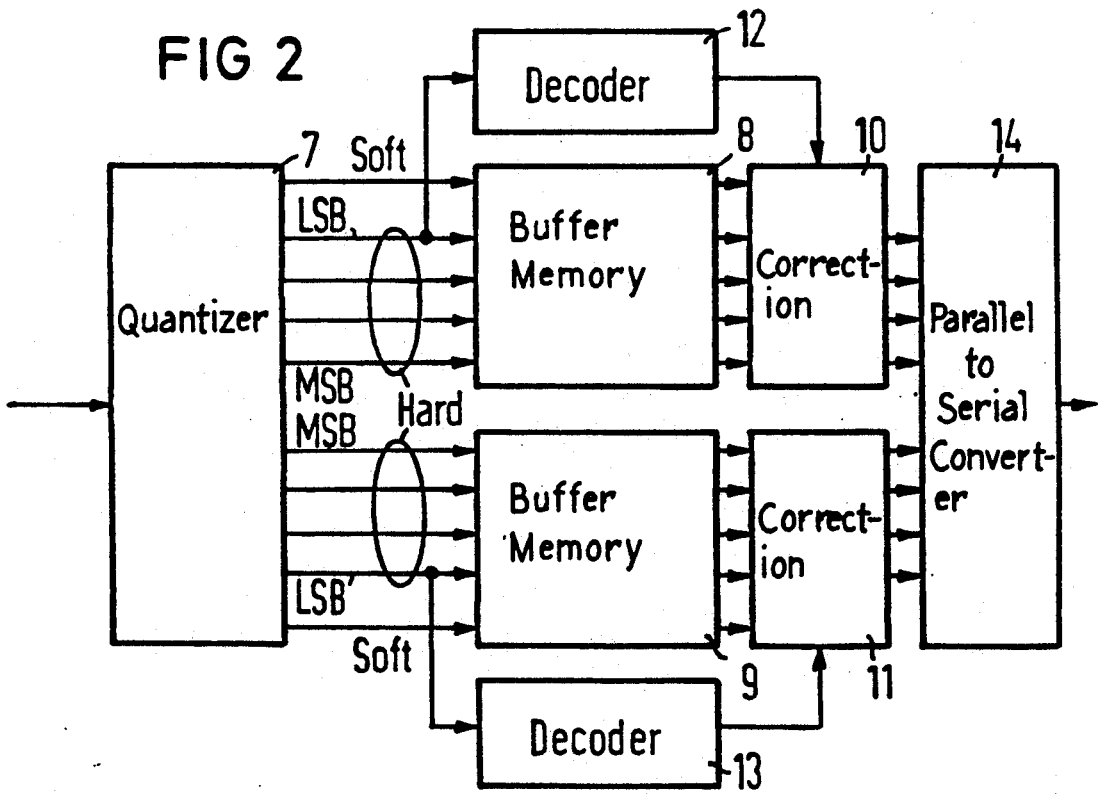

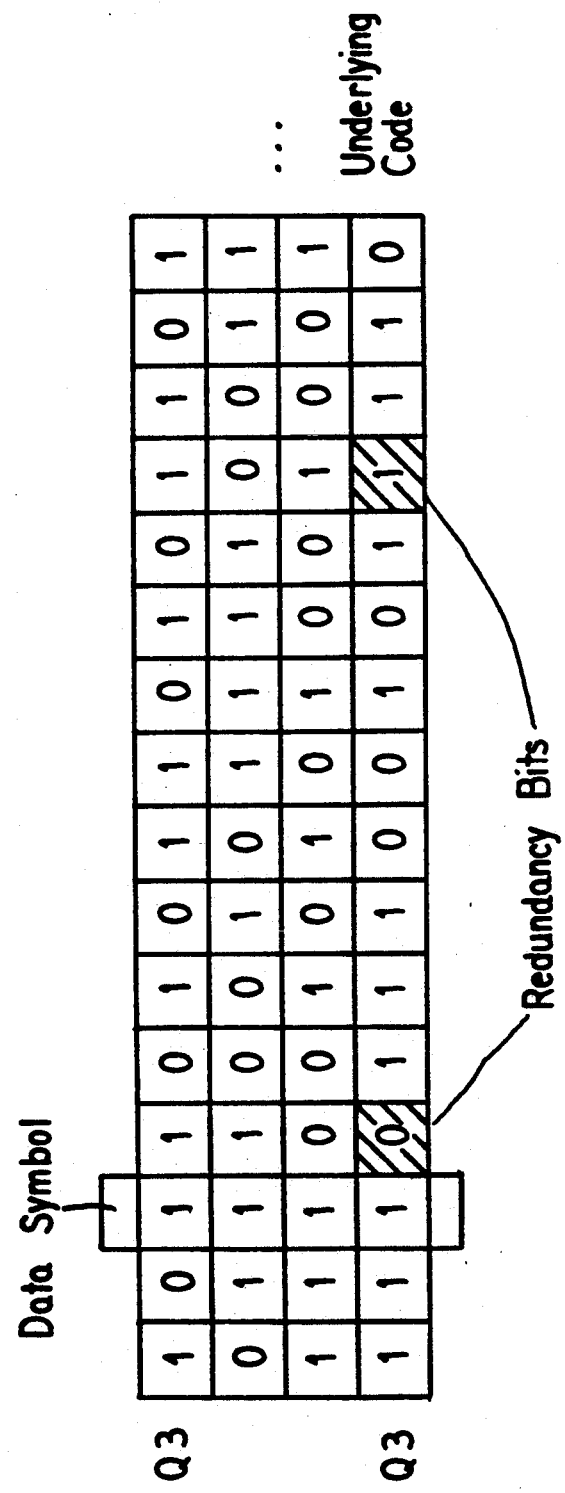

METHOD FOR REDUNDANCY-SAVING, ERROR-CORRECTING CODING IN DIGITAL RADIO LINK SYSTEMS HAVING MULTI-LEVEL MODULATION

BACKGROUND OF THE INVENTION

The invention is directed to a method for redundancy saving, error-correcting coding in digital radio link systems having multi-level modulation on the basis of forward error correction and is also directed to a following decoding.

M-earner quadrature amplitude modulation (M-QAM) is generally utilized in digital radio link systems to meet the demand for an efficient utilization of the spectrum. The trend of development is thereby to larger and larger numbers of levels, or steps, for example M=64 or 256. Systems having such a high number of levels, however, are significantly more sensitive to disturbing influences of all types such as, for example, noise, adjacent-channel interference and signal distortions than are systems having a low number of levels. The susceptibility of digital radio link systems to disturbance, however, can generally be reduced by an error-correcting coding. Only methods having forward error correction (FEC) are considered since the data rate is rigidly prescribed. For reasons of the greatly limited bandwidth, an increase in the transmission rate for the acceptance of the redundancy required for FEC is only justifiable up to about 3%. This great limitation requires the utilization of FEC methods that are optimally adapted to the properties of the transmission channel, so that an efficient utilization of the only slight redundancy is achieved.

The employment of some standard FEC methods in 64 QAM radio link systems is described in the following references:

M. Kavehrad, "Convolutional Coding for High-Speed Microwave Radio Communications", AT&T Technical Journal, Vol. 64, No. 7, Sept. 1985, pp. 1625–1637; S. Bellini et al., "Coding for Error Correction in High Capacity Digital Radio: An Application to 64 QAM Systems", European Conference on Radio-Relay Systems (ECRR), Munich, Nov. 1986, pp 166–172 and T. Noguchi et al., "6 GHz 135 MBPS Digital Radio System with 64 QAM Modulation", International Conference on Communications (ICC), Boston, June 19–22, 1983, Vol. 3, pp 1472–1477.

A convolutional self-orthogonal code (CSOC), a Reed-Solomon Code or, respectively, a block code having Lee metrics are used for error correction in these examples. Significant disadvantages of these methods are that they use a relatively high redundancy, utilize redundancy only inadequately for error correction and/or require a considerable system outlay.

The reference by G. Ungerboeck, "Trellis-Coded Modulation with Redundant Signal Sets", Parts I and II, IEEE Communications Magazine, Vol. 25, No. 2, Feb. 1987, pages 5–21 discloses an efficient FEC method wherein the redundancy is absorbed by a doubling of the number of steps and wherein no increase of the transmission rate is required. This method, however, requires the employment of an involved Viterbi decoder. Given a high number of levels, moreover, a further doubling thereof makes it susceptible to unavoidable system imperfections such as, for example, a non-ideal carrier recovery.

A redundancy-saving FEC method that is employable for QAM systems with Gray coding is presented in the reference by P. Mecklenburg et al, "Correction of Errors in Multilevel Gray-Coded Data", IEEE Trans. Inf. Theory, Vol. IT-19, No. 3, May 1973, 336–340. The n bits of each and every symbol to be transmitted are first compressed to i<n bits by exclusive-OR operations. Finally, only these i bits are involved in a so-called underlaid coding as representatives of the transmission symbols. For radio link systems having a high number of levels, the method has the advantage that the overall system redundancy is noticeably lower due to the compression than is the effective redundancy of the underlaid code, namely all the more noticeably the higher the number of levels. What is disadvantageous is that the method is dependent on a Gray coding of the symbol points in the modulation plane. It can therefore not be used in systems that, for example, require a differential coding for the elimination of quadrant ambiguities or that do not employ a Gray-codeable (for example, hexagonal) modulation strategy.

SUMMARY OF THE INVENTION

The object of the invention is to create a redundancy saving FEC method that is employable in a multitude of systems.

In accord with the invention, this object is achieved in such fashion that the serial, binary data stream to be transmitted is supplied to a means for rate matching and serial-to-parallel conversion in which, first, the data rate is increased to the transmission rate upon formation of free locations for the acceptance of redundancy bits, and second, a corresponding plurality of parallel data streams is generated from the serial data stream, one half of these parallel data streams forming the I-channel or, respectively, the Q-channel; in that the respectively least significant bit of the I-channel and Q-channel in which the redundancy locations lie is supplied to the two inputs of a multiplexer first directly and, secondly, via a coder, this multiplexer having its output side connected to a quadrature modulator, with the more significant bits of the I-channel and the Q-channel directly controlling the appertaining inputs of the quadrature modulator; and the coders each consider a sequence consisting of a defined plurality of k incoming bits and generate one or more redundancy bits therefrom in accord with the coding rule of an underlaid code, these redundancy bits being inserted with the assistance of the multiplexer at the locations in the I-channel or Q-channel provided therefore; and possible transmission errors are corrected in a decoder means.

Proceeding from the method of Mecklenburg, the method of the invention has the additional advantage that it does not require a Gray coding, and can be employed for almost any arbitrary modulation strategy.

Advantageous developments and improvements of the subject matter of the invention are recited in the subclaims.

BRIEF DESCRIPTION OF THE DRAWINGS

The invention shall be set forth in greater detail below with reference to an exemplary embodiment shown in the drawing, in which:

FIG. 1 is a functional block diagram of the structure of coding means for a 256-QAM system;

FIG. 1B is an illustration of an encoded data sequence.

FIG. 2 is a functional block diagram of the structure of a decoding means for the application of the underlaid coding in a 256-QAM system;

DESCRIPTION OF THE PREFERRED EMBODIMENT

Figure 3:
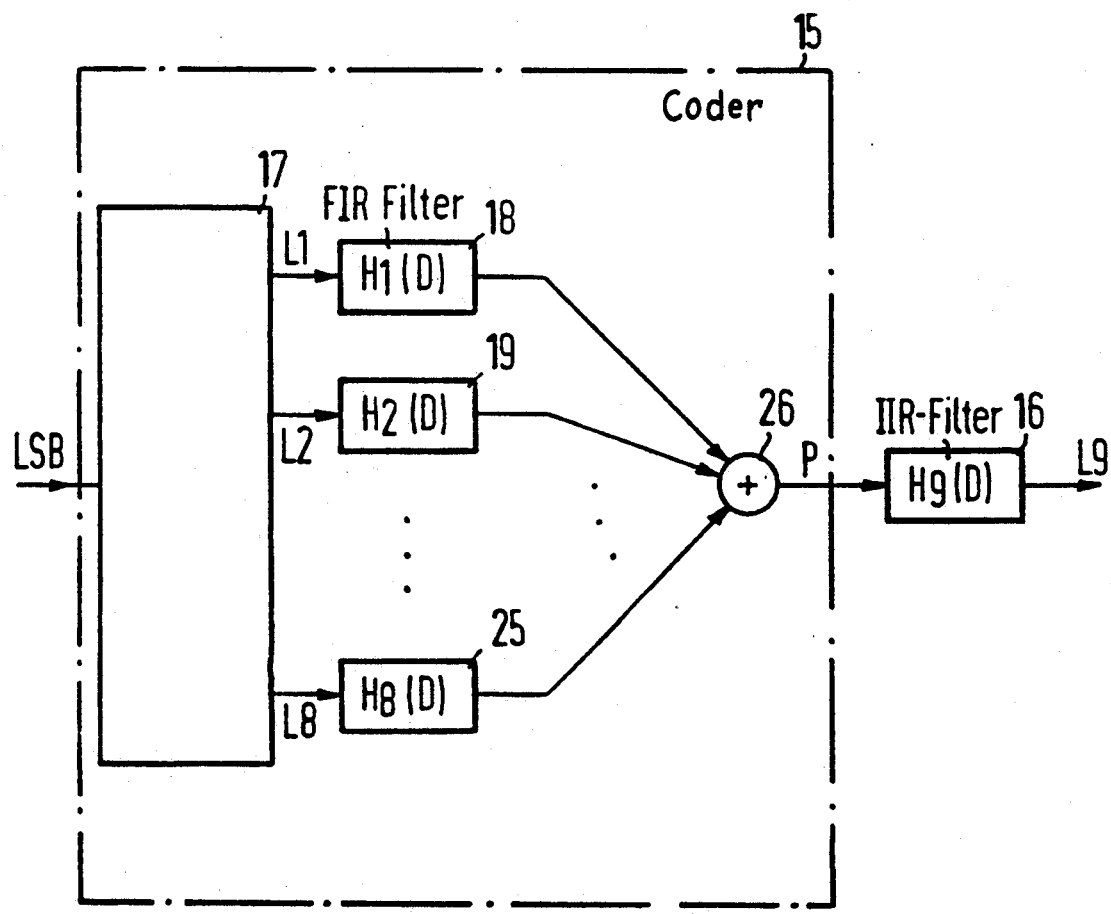
FIG. 3 is a functional block diagram of the coder structure of a modified CSOC having the rate $R_c=8/9$.

The functioning of the underlaid coding shall be set forth first below with reference to the example of a 256-QAM system in order to explain the invention. Nonetheless, it can also be utilized for other multilevel types of modulation.

The function of the underlaid coding is based on the fact that most transmission errors that appear in transmission systems having multilevel modulation are falsifications in neighboring symbols (what are referred to as one-level errors). The probability that a transmitted symbol will be falsified over one or even more symbol levels is usually a number of powers of ten less than the probability of a falsification in a neighboring symbol. The goal of the underlaid coding is then to exclusively correct one-level errors. It is not necessary for this purpose to involve all transmitted data bits in the error-correcting code; rather, it is adequate when only the least significant bit (LSB) of each and every symbol from the I-channel or Q-channel is coded.

FIG. 1A shows the structure of the coding means for a 256-QAM system. The serial, binary data stream to be transmitted is first supplied to a means 1 for rate matching and serial-to-parallel conversion. In this means, first, the data rate is increased to the transmission rate so that free locations for the acceptance of the redundancy bits arise; second, eight parallel data streams are generated from the serial data stream. Of these eight data streams, four form the I-channel and the other four form the Q-channel. The rate matching is designed such that the redundancy locations always lie in the least significant bits (LSB) of the I-channel and Q-channel. The three more significant bits of the I-channel and Q-channel directly control the appertaining inputs of a quadrature modulator 2, whereas the LSB is supplied to the appertaining input of the quadrature modulator 2 via a respective multiplexer 3 or 4. In addition, the LSB of the I-channel and Q-channel is respectively supplied to a coder 5 or 6. Each of the two coders 5, 6 considers a sequence consisting of a defined plurality of k incoming bits and generates one or more redundancy bits therefrom, according to the coding rule of an underlaid code that shall be specified in greater detail later. These latter redundancy bits are inserted with the assistance of the two multiplexers 3 and 4 at the locations in the I-channel and the Q-channel.

The described method of underlaid coding has the effect that the overall rate $R_G$ of the system is noticeably higher than the rate $R_c$ of the underlaid code. The relationship $$\frac{1-R_C}{1-R_G} = ld\sqrt{M}.$$

is generally valid for a M-QAM-system wherein only the LBB of the I-channel and Q-channel is involved in the coding. For example, from a coding rate of $R_c=8/9$ (equivalent to 12.5% coding redundancy), the overall rate $R_G=35/36$ (equivalent to 2.8% system redundancy) is calculated with this equation for a 256-QAM system. What is only a slight system redundancy is therefore transformed into a greater effective code redundancy.

As an example, FIG. 1B shows a coded data sequence of the Q-channel corresponding to the inputs Q0...Q3 of the quadrature modulator 2 of FIG. 1A. In this example, the underlaid code (LSB sequence Q0) comprising one redundancy bit per eight information bits resulting in a code rate of $R_c=8/9.\Delta$ The functioning of the decoding method shall be explained with reference to FIG. 2, which shows the structure of a decoding means for using the underlaid coding in a 256-QAM system. The received, analog symbol values are first quantized into digital data words (symbols) in a quantizer means 7, for example a conventional quadrature demodulation with an analog-to-digital converter. The resolution of the quantization must thereby be so fine that at least on soft decision bit is available for each of the I-channel and the Q-channel, in addition to the four hard decision bits that correspond to the resolution of the transmission symbols. In practice, however, this generally means no limitation since a plurality of soft decision bits are required anyway to accomplish, for example, carrier recovery or for controlling an equalizer means. The digital symbols of the I-channel and Q-channel are respectively delayed in a buffer memory 8 or, respectively 9 and are supplied to a following correction means 10 or, respectively, 11 whose outputs are connected to a parallel-to-serial converter 14. According to the concept of the underlaid coding, further, the respective LSB of the hard decision bits is supplied to a decoder 12 or, respectively, 13 whose output is connected to the respective correction means 10 or, respectively, 11. When a one-level symbol error appears on the transmission path, the appertaining LSB will be falsified, as a result. In accord with the coding rule of the underlaid code, the decoder now analyzes a sequence of successive LSBs. Insofar as its correction capacity is not exceeded, it recognizes the falsified LSB and outputs a correction pulse at its output when the appertaining symbol is adjacent at the input of the correction means. Under the condition that the transmission error was a single-level error, the correction means 10 or, respectively, 11 can correct the error in that it adds either $+1$ or $-1$ to the binary symbol value. The decision regarding whether $+1$ or $-1$ is added can be made on the basis of the soft decision bit.

Arbitrary block or convolution codes can fundamentally come into consideration for the underlaid code, on the basis of which the coder (see FIG. 1) generates the redundancy bits and the decoder (see FIG. 2) decodes the transmission errors. In the present case, however, the employment of a convolutional self-orthogonal code is of special interest. The reason for this is that CSOCs require only a relatively slight coding and decoding outlay. This is of particular significance in radio link technology in view of the fast signal processing. There is already an extensive literature about the theory and practice of CSOCs, for example the initially referenced article by M. Kavehard or the book "Error-Correction Coding for Digital Communications" by G.C. Clark, Jr., J.B. Cain, Plenum Press, N.Y., 1982. A more detailed description of the functioning is thus unnecessary.

The known coding and decoding methods of CSOCs, however, cannot be directly employed in conjunction with the concept of the undeclared coding. These methods namely, do not provide that the transmitted check bits can also be corrected in addition to the transmitted data bits. In the present case, however, the check bits are also a component part of data symbols and should likewise be correctable. The CSOC that is employed must therefore be modified. These modifications undertaken in the fashion of the invention shall be set forth below with reference to FIGS. 3 and 4. These show the structures of coder and decoder for an underlaid, modified CSOC having the rate $R_c = 8/9$.

Given the coder structure of a modified CSOC shown in FIG. 3, the part 15 bounded with broken lines contains a conventional coder of a CSOC. The modification relates to the additional part 16 outside of the broken-line boundary. The functioning of the coder shall be set forth in brief below: the incoming serial data bits (LSB) are first converted into eight parallel, binary data streams L1 through L8 in a serial-to-parallel converter 17. Each of these eight data streams is supplied to one of binary digital FIR (Finite Impulse Response) filters 18 through 25. The transfer functions $H_i(D)$ of the FIR filters 18 through 25 are identical to the generator polynomials $G_i(D)$, $i = 1, 2, \ldots, 8$ of the employed code, viz.

$$H_i(D) = G_i(D), i = 1, 2, \ldots, 8.$$

The appertaining literature can likewise be referenced with respect to the definition of the generator polynomials of a CSOC, for example the aforementioned book by Clark and Cain. The outputs of the FIR filters 18 through 25 are combined with one another via a modulo-2 adder 26. The arising check bits P are now supplied to a binary digital IIR (Infinite Impulse Response) filter 16, in accord with the invention, i.e. are supplied to that part of the coder structure lying outside of the broken-line boundary 15. The transfer function of this filter reads $$H_9(D) = 1/G_9(D),$$

whereby $G_9(D)$ is a further generator polynomial. The modified code does not employ only eight but a total of nine generator polynomials. A filter having the above transfer function is realized in the form of a feedback shift register. In a practical execution, the eight FIR filters 18 through 25 and the IIR filter 16 need not all be separately, constructed but can be combined into a single, tapped, feedback shift register in accord with the theory of digital filters. The discrete illustration selected in FIG. 3 merely serves for a better understanding of the functioning.

Figure 4:
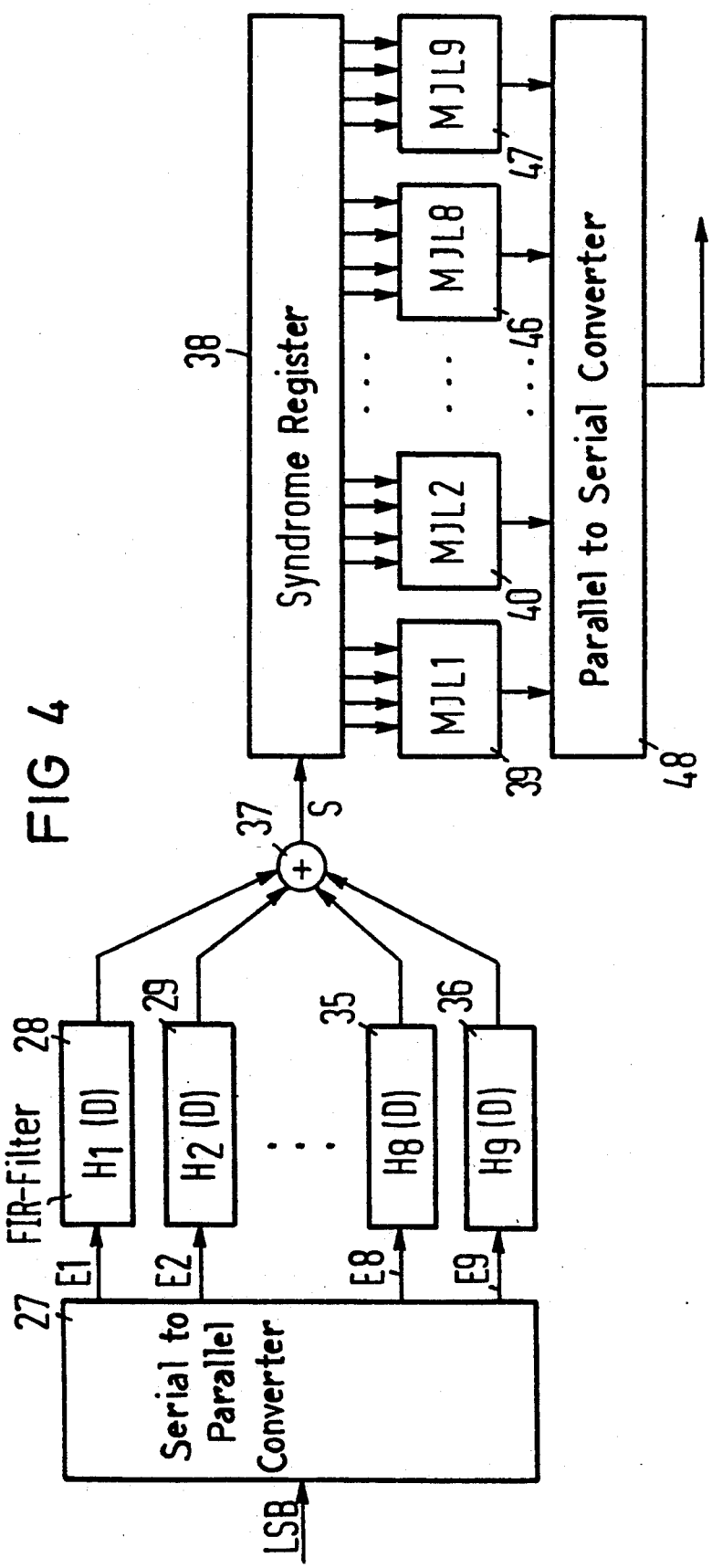
FIG. 4 is a functional block diagram of the structure of the decoder for the modified CSOC having the rate $R_c=8/9$.

Given the decoder shown in FIG. 4, the received, serially incoming bits (LSB) are converted into nine parallel bit streams E1 through E9 in a serial-to-parallel converter 27. These parallel bit streams correspond to the eight data streams L1 through L8 as well as to the check bit stream L9 in the coder (see FIG. 3). Each of the nine bit streams E1 through E9 is supplied to a binary digital FIR filter 28 through 36. The transfer functions $H_i(D)$ of these filters are identical to the generator polynomials of the code, i.e.

$$H_i(D) = G_i(D), i = 1, 2, \ldots, 9.$$

In contrast to a conventional decoder, the received check bit stream E9 is also filtered with a FIR filter in the present case according to the invention. Of course, the nine parallel (.IR filters in the decoder can also be combined in the form of a shift register with appropriate taps in the practical execution. The filter output signals are combined via a modulo-2 adder 37 to form what is referred to as a syndrome S that is then initiated into a syndrome register 38. In accord with the generator polynomials, the syndrome register 38 contains a total of $4 \times 9 = 36$ taps. Respectively four taps that correspond to one generator polynomial are supplied to one of more majority logic units 39 through 47. A majority logic is a circuit that outputs the logical value 1 at its output when a majority of the input signals (i.e., at least three in this case) assumes the logical value 1. Alternatively, threshold logic units may be used in he decoder instead of the majority logic units, such toehold logic units also using the soft decision information for decoding the transmission errors. In expansion to a conventional decoder, and in accord with the nine FIR filters 28 through 36, nine majority logic units, instead of only eight, are likewise employed in the present case. Together with the corresponding taps, these majority logic units take the form of what are referred to as. (i.e., matched) filers for the appertaining generator polynomials. The output signals of the majority logic units are combined to form an output signal with the assistance of a parallel-to-serial converter 48. This output signal represents the correction signal.

The concept of underlaid coding that has been set forth above is not limited to the correction of single-level symbol errors. By involving two bits per symbol in the underlaid code, all possible single-level and two-level symbol errors can be corrected; and, by involving three bits per symbol, all possible single-level through four-level symbol errors could be corrected. A further improvement in the performance capability of the decoder can be achieved in that further soft decision bits are utilized for the detection of the transmission errors in addition to the hard decision LSB.

It will be understood that variations and modifications may be effected without departing from the spirit and scope of the novel concepts of the present invention.

It is claimed:

1. A method for redundancy-saving, error-correcting coding in digital radial link systems having multi-level modulation, using forward error correction, comprising the steps of:

supplying the serial binary data stream to be transmitted to a means for rate matching and serial-to-parallel conversion, in which first, the data rate is increased to the transmission rate and three locations are formed for the acceptance of redundancy bits and, second, a corresponding plurality of parallel data streams is generated from the serial data stream, with one half of these parallel data streams forming the I-channel and, the other half forming the Q-channel;

supplying the least significant bit of the I-channel and the least significant bit of the Q-channel, in which the redundancy locations lie, to the two inputs of a multiplexer, first directly and, secondly, via a coder, the output side of said multiplexer being connected to a quadrature modulator, with the more significant bits of the I-channel and Q-channel directly controlling corresponding inputs of said quadrature modulator;

said coders each receiving inputs from said means for rate matching and serial-to-parallel conversion in the form of a sequence consisting of a defined plurality of k incoming bits to generate one or more redundancy bits therefrom in accord with the coding rule of an underlaid code, said redundancy bits being inserted with the assistance of said multiplexer at locations in the I-channel and Q-channel; and correcting transmission errors in a decoder means.

2. The method according to claim 1, including the step whereby the received, analog symbol values are first quantized into digital data words in a quantizer means within the decoder means, being quantized with such a fine resolution of the quantization that at least one soft decision bit is respectively available for the I-channel and of the Q-channel in addition to the hard decision bits; and including the step of delaying the digital data words of the I-channel and Q-channel in a buffer memory, supplying the output of said buffer memory to a correction means, the least significant it of said quantizer means being supplied to a decoder connected to the input side o the correction means, this decoder analyzing a sequence of successive least significant bits in accord with he decoding rule of he underlaid code and, given recognition of a falsified least significant it, outputting a correction pulse at its output to the correction means that then undertakes a correction of the transmission error, in which the symbol value (level) at the output of the buffer memory is lowered or raised by the value 1, depending on whether the most significant soft decision bit at the buffer output has the logic value of 0 or 1.

3. The method according o claim 2, including he sep of supplying one or more soft decision bits to the decoder in addition to the least significant hard decision bit; and using threshold logic units in the decoder instead of the majority logic units, these threshold logic units also utilizing the soft decision information for deciding the transmission errors.

4. The method according to claim 1, wherein said coder executes a modified convolution self-orthogonal code having the rate $R_c = 8/9$, whereby the incoming, serial data bits are converted into a corresponding plurality of binary data streams, each of which is supplied to a binary digital finite impure response (FIR) filer whose transfer function $H_i(D()$ is identical to the generator polynomials $G_i(D)$ (i=1,2...8) of the employed code and whose outputs are combined with one another via a modulo-2 adder; and including the step of supplying the check bits arising therein to a binary digital infinite impulse response (IIR) filter whose transfer function is $H_9(D) = 1/G_9(D)$, whereby $G_9(D)$ is a generator polynomial.

5. The method according to claim 4, including the step of employing a feedback shift resister for said IIR filter.

6. The method according to claim 4, including the step of combining said FIR filters and said IIR filer to form a single, tapped, feedback shift register.

7. The method according to claim 4, including the step of combining the parallel FIR filters to form a shift register having corresponding taps.

8. The method according to claim 1, wherein said decoder executes a modified convolutional self-orthogonal code having the rate $R_c = 8/9$, whereby the serially incoming bits are converted into a plurality of parallel bit streams, each of which correspond to a data streams as well as to the check bit stream in the coder;

supplying each of these bit streams to a binary digital FIR filter whose transfer functions $H_i(D)$ are identical to the generator polynomials $G_i(D)$ of the code, whereby the received check bit stream is also filtered with a FIR filter;

combining the filter output signals via a modulo-2 adder to form a syndrome that is initiated into a syndrome register that contains taps corresponding to the generator polynomials;

supplying a plurality of signals from respective taps that correspond to a generator polynomial each to a majority logic unit, corresponding to one of said FIR filters and, together with the corresponding taps, realizing adaptive filters for the appertaining generator polynomials; and laminating the output signals of the majority logic units to form an output signal as a correction signal, with the assistance of a parallel-to-serial converter.

9. The method according to claim 1, including the step of using a code which exhibits an arbitrary rate $R_c = m/n$, whereby m and n are whole numbers.

10. The method according to claim 1, including the step of using one or two more significant hard decision bits in the coding and decoding, in addition to the least significant hard decision bit.

* * * * *